United States Patent [19]

Kusuoka et al.

US005726242A

[11] Patent Number: 5,726,242
[45] Date of Patent: Mar. 10, 1998

[54] TWO-PACK AQUEOUS ADHESIVE

[75] Inventors: Hiroyuki Kusuoka, Daito; Hideaki Kawami, Takatsuki, both of Japan

[73] Assignee: Sunstar Giken Kabushiki Kaisha, Takatsuki, Japan

[21] Appl. No.: 508,530

[22] Filed: Jul. 28, 1995

[30] Foreign Application Priority Data

Sep. 14, 1994 [JP] Japan .................................. 6-219837

[51] Int. Cl.$^6$ .................. C08K 3/20; C08L 75/06
[52] U.S. Cl. ............... 524/839; 524/503; 524/557; 524/591; 525/939
[58] Field of Search ................ 525/939; 524/839, 524/503, 557, 591

[56] References Cited

U.S. PATENT DOCUMENTS 5,270,433  12/1993  Klauck et al. .................. 524/158

FOREIGN PATENT DOCUMENTS

044259A1   9/1991   European Pat. Off. .
2 250 804  6/1975   France .
9405738    3/1994   WIPO .
WO 94/05738 3/1994  WIPO .

OTHER PUBLICATIONS

"Hawley's Condensed Chemical Dictionary", 1993, p. 931.

*Primary Examiner*—Melvin I. Marquis
*Assistant Examiner*—D. Aylward
*Attorney, Agent, or Firm*—Jacobson, Price, Holman & Stern, PLLC

[57] ABSTRACT

A two-pack aqueous adhesive, which comprises (A) an adhesive component comprising (a) a polycarbonate-urethane aqueous dispersion having a pH 5.0–8.5, which is prepared by self-emulsifying a carboxyl group-containing, hydroxy-terminated polyurethane polymer obtained from a polycarbonate diol, a carboxyl group-containing chain extender and a polyisocyanate compound in water in the presence of a tertiary amine, and (b) a conventional aqueous emulsion of a synthetic resin or a synthetic rubber, and (B) a curing component comprising a polyisocyanate compound, which can be cured even at a low temperature and is suitable for dry lamination of a product having complicated shape.

6 Claims, No Drawings

TWO-PACK AQUEOUS ADHESIVE

FIELD OF THE INVENTION

This invention relates to a two-pack aqueous adhesive, more particularly, to a two-pack type aqueous adhesive which can be cured by crosslinking reaction of an adhesive component and a curing component and is effective even at a low temperature (e.g. at about 5° C.). The aqueous adhesive is particularly suitable for dry lamination of a product having complicated shape which requires to show an excellent initial adhesion being able to oppose to the stress due to the complicated shape of the base material and further has excellent durability in adhesion properties, while it is effective for adhesion even at a low temperature.

PRIOR ART

Lamination of a skin material (e.g. a foam layer) to a base material (e.g. plastic material) having complicated shape has usually been carried out by dry lamination, i.e. by pressing or vacuum forming. For example, a plastic base material, e.g. a base material of acrylonitrile/butadiene/styrene copolymer (hereinafter, referred to as "ABS"), which has a complicated shape is laminated with various skin materials by applying an adhesive to the base material, drying it, and laminating a skin material (optionally, said skin material being previously subjected to treatment with a primer) under vacuum, or by pressing, whereby both of forming and adhering are simultaneously effected.

In these laminating techniques, there have hitherto been used two-pack, organic solution type adhesive comprising a polyester, polyurethane or chloroprene adhesive component and a curing component comprising a polyisocyanate compound. However, such a conventional two-pack, organic solution type adhesive contains an organic solvent for the adhesive component which causes environmental pollution. In view of such a problem, it is required to develop an aqueous adhesive which contains no or little organic solvent. It is also desired to take the dry lamination at a low temperature because it is advantageous in view of saving of energy and safety in working.

For such a purpose, it has been tried to use a two-pack aqueous adhesive which comprises an adhesive component comprising an aqueous dispersion of a polyester polyurethane in combination with a curing component comprising a polyisocyanate compound (Japanese Patent First Publication (Kokai) No. 279647/1993). However, this aqueous adhesive is not satisfactory in the conditions required for the dry lamination, that is, it has less properties at a low temperature, particularly inferior appearance and quality (e.g. less gloss, debossing, etc.) of the formed product, inferior initial heat resistance, and inferior durability.

BRIEF DESCRIPTION OF THE INVENTION

The present inventors have intensively studied to find an improved two-pack aqueous adhesive suitable for dry lamination of various plastic base material with a skin material having a foam layer by pressing or vacuum forming, and have found that the desired aqueous adhesive, which is curable by crosslinking at a low temperature and has long pot-life and excellent viscosity stability, can be obtained by combination of an adhesive component comprising an aqueous dispersion of a polycarbonate-urethane having a specific pH value prepared by self-emulsifying a carboxyl group-containing, hydroxy-terminated polyurethane polymer in water in the presence of a tertiary amine and a conventional aqueous emulsion and a curing component comprising a polyisocyanate compound.

An object of the invention is to provide a two-pack aqueous adhesive which is curable at a low temperature and has excellent properties, such as long pot-life, excellent initial heat resistance, and excellent durability. Another object of the invention is to provide an adhesive using no or little organic solvent which causes undesirable environmental pollution. These and other objects and advantages of the invention will be apparent to those skilled in the art from the following description.

DETAILED DESCRIPTION OF THE INVENTION

The two-pack aqueous adhesive of this invention comprises (A) a main (adhesive) component comprising (a) an aqueous dispersion of a polycarbonate-urethane having a pH 5.0–8.5, which is prepared by self-emulsifying a carboxyl group-containing, hydroxy-terminated polyurethane polymer obtained from a polycarbonate diol, a carboxyl group-containing chain extender and a polyisocyanate compound in water in the presence of a tertiary amine, and (b) a conventional aqueous emulsion of a synthetic resin or a synthetic rubber, and (B) a curing component comprising a polyisocyanate compound.

The aqueous dispersion of a polycarbonate-urethane compound (a) used as the main component may be prepared as follows.

A polycarbonate diol having usually a number average molecular weight of 500 to 3000, a carboxyl group-containing chain extender and a polyisocyanate compound are reacted optionally in a suitable organic solvent (e.g. methyl ethyl ketone, ethyl acetate, toluene, dimethylformamide, methyl isobutyl ketone, or N-methylpyrrolidone, or a mixture of them) at a temperature of 60° C. to 120° C. for 2 to 8 hours, neutralizing the resulting carboxyl group-containing, hydroxyl-terminated polyurethane polymer (when it is obtained in the form of a solution, it is used as it stands) with a tertiary amine, and then self-emulsifying the resultant in water, if necessary, followed by removing the organic solvent. Said polycarbonate-urethane dispersion thus obtained has a content of solid components of 25 to 50% by weight.

The polycarbonate diol used in the invention includes aliphatic polycarbonates and aromatic polycarbonates which have diol groups at both ends. The preferred polycarbonate diols are shown by the following formulae:

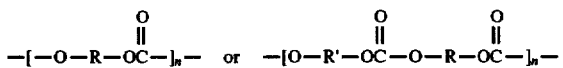

wherein R and R' are the same as or different and are each a straight chain or branched chain alkyl group having 1 to 7 carbon atoms, a phenyl group, a phenylalkyl group having 1 to 4 carbon atoms in the alkyl moiety, a biphenyl group, or a cycloalkyl group having 5 to 6 carbon atoms, and n is 2 to 50. Other polycarbonate diols as disclosed in "Polycarbonate Hand Book" 1992 (issued by Nikkan Kogyo Shinbunsha) may also be used. These polycarbonate diols have a number average molecular weight of 500 to 3,000. Some polycarbonate diols are commercially available, for example, Polycarbonate Diol CD-220 (manufactured by Daicel Chemical Industries, Ltd., Japan), Polycarbonate Diol D-2000 (manufactured by Toagosei Chemical Industry Co., Ltd., Japan), Polycarbonate Diol CD-220PL (manufactured by Daicel Chemical Industries, Ltd., Japan).

The carboxyl group-containing chain extender includes, for example, compounds of the formula:

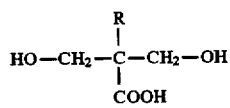

wherein R is hydrogen atom or a straight chain or branched chain alkyl group having 1 to 3 carbon atoms. Suitable examples thereof are dimethylolpropionic acid (abbrebiated as "DMPA"), dimethylolbutyric acid, dimethylopentanoic acid, and the like.

The polyisocyanate compound includes, for example, aliphatic polyisocyanates such as hexamethylene diisocyanate, 2,2,4-trimethylhexamethylene diisocyanate; alicyclic polyisocyantes such as isophorone diisocyanate, hydrogenated xylylene diisocyanate, 4,4-cyclohexylmethane diisocyanate; araliphatic polyisocyanates such as xylylene diisocyanate, tetramethylxylylene diisocyanate; aromatic polyisocyanates such as toluene diisocyanate, diphenylmethane diisocyanate, and the like.

In the above reaction, the carboxyl group-containing chain extender may be used in an amount of 0.5 to 2.5 moles to 1 mole of the polycarbonate diol. When the amount of the chain extender is less than 0.5 mole, the reaction product shows inferior self-emulsifiability, and on the other hand, when the amount is over 2.5 moles, the reaction product tends to show too high polarity and less adhesion.

The polyisocyanate compound may be used in an amount of 0.5 mole to less than 1 mole to total 1 mole of the polycarbonate diol and the carboxyl group-containing chain extender. When the amount of the polyisocyanate compound is less than 0.5 mole, the unreacted monomers of polycarbonate diol and carboxyl group-containing chain extender are remained, which results in the production of water-insoluble product and/or less adhesion properties of the product. When the amount is 1 mole, the obtained carboxyl group-containing, hydroxy-terminated polyurethane polymer has too high molecular weight and become gelation, and further when the amount is over 1 mole, the resultant product become a prepolymer having an active NCO group at the terminal which is different from the desired compound in the present invention.

In the above reaction, there may be used other conventional chain extender in addition to the carboxyl group-containing chain extender, for example, diols such as 1,2-propanediol, neopentyl glycol, 3-methyl-1,5-pentanediol, ethyl-butyl-propanediol, etc., which may be used in an amount of not more than 2.5 moles to 1 mole of the polycarbonate diol. In this case, it is preferable to use the polycarbonate diol in an increased amount. When the other chain extender is used in too much amount, the carboxyl group-containing, hydroxy-terminated polyurethane polymer obtained by the reaction shows higher softening point, which is not suitable for dry lamination at a low temperature and further tends to show less adhesion.

The tertiary amine used for the neutralization of the above carboxyl group-containing, hydroxy-terminated polyurethane polymer includes amines of the formula:

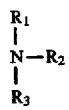

wherein $R_1$, $R_2$ and $R_3$ may be the same or different and are each a straight chain or branched chain alkyl group having 1 to 4 carbon atoms, $-(CH_2)_n-OH$, $-(CH_2O)_m-OH$, $-(CH_2CH_2O)_m-OH$,

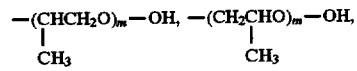

or $-((CH_2)_1-O)_m-H$; n is 1 to 4, m is 2 to 5, and 1 is 2 to 5. Suitable examples of the amines are triethylamine, triethanolamine, dimethylethanolamine, diethylethanolamine, dibutylethanolamine, aminoethoxyethanolamine, methylethanolamine, methyldiethanolamine, N-ethylmorpholine, dimethylaminoethoxyethanol, and the like. The amines are used in an amount of 0.5 to 2.5 equivalents to the COOH group of the carboxyl group-containing, hydroxy-terminated polyurethane polymer. When the amount of the amine is less than 0.5 equivalent, the resulting product has inferior hydrophilic properties, and when the amount is over 2.5 equivalents, the product has too high pH value which causes to increase of viscosity of the product. It is important to adjust the pH of the polycarbonate-urethane dispersion in the range of 5.0 to 8.5, more preferably 6.0 to 7.0, in order to obtain the desired adhesive having a long pot-life and excellent stability in viscosity.

The component (b), that is, the conventional aqueous emulsion of a synthetic resin or a synthetic rubber includes, for example, an aqueous emulsion of copolymers, such as ethylene/vinyl acetate copolymer, a copolymer of ethylene/vinyl acetate/other copolymerizable monomer (e.g. acrylic acid or a derivative thereof, methacrylic acid or a derivative thereof, various vinyl compounds, maleic anhydride, etc.); an aqueous emulsion of an acrylic polymer, a styrene-butadiene rubber (SBR), an acrylonitrile-butadiene rubber (NBR), a chlorinated polypropylene, or a chlorinated rubber; an anionic or nonionic aqueous emulsion of polyesters; an aqueous emulsion of various tackifier resins (e.g. rosinic acid, rosinic acid esters, $C_5$ petroleum resin, $C_9$ petroleum resin, coumarone-indene resin, hydrogenated, disproportionated or partially hydrogenated products of these resins). These aqueous emulsions may be used alone or in combination of two or more thereof. The aqueous emulsions may usually be used in an amount of 5 to 1000 parts by weight to 100 parts by weight (as solid) of the above polycarbonate-urethane aqueous dispersion (a). When the amount of the aqueous emulsion is less than 5 parts by weight, the product does not show sufficient creep properties and initial adhesion at a low temperature, and on the other hand, when the amount is over 1000 parts by weight, the product tends to lower the heat resistance, durability and moisture resistance.

The polyisocyanate compound to be used as a curing component (B) may be the same polyisocyanate compounds as used in the production of the polycarbonate urethane aqueous dispersion (a), and preferred compounds are water-dispersible polyisocyanate compounds having a hydrophilic group (e.g. sulfonic acid group, tertiary amino group, carboxyl group, etc.) within the molecule, some of which are commercially available, for example, Coronate C-3062 (manufactured by Nippon Polyurethane Industry Co., Ltd.), Desmodur DA (manufactured by Bayer A. G.), Sumidur 0772 (manufactured by Sumitomo Bayer Co., Ltd.); and the polyisocyanate emulsion prepared by emulsifying a polyisocyanate compound with a conventional emulsifying agent, some of which are commercially available, for example Coronate C-3053 (manufactured by Nippon Polyurethane Industry Co., Ltd.).

In addition, there may be used as the curing component other polyurethane prepolymers having a hydrophilic group within the molecule (containing usually 10 to 30% by weight of NCO group) which are prepared by reacting an excess amount of an aliphatic polyisocyanate (e.g. hexamethylene diisocyanate, 2,2,4-trimethylhexamethylene diisocyanate, etc.) with a polyether polyol (e.g. polyoxyalkylene polyol, modified polyether polyol, polytetramethylene ether glycol, etc.), or an emulsion of said polyurethane prepolymers prepared by emulsifying them with a conventional emulsifying agent.

The two-pack aqueous adhesive of the invention comprises the main adhesive component (A) comprising a specified ratio of the polycarbonate-urethane aqueous dispersion (a) and an aqueous emulsion of a synthetic resin or a synthetic rubber (b) and the curing component (B) comprising a polyisocyanate compound. Both of the adhesive and curing components are weighed and mixed just before the use and then applied to the materials to be laminated. After applying the adhesive, the base material is piled with a skin material, and then is subjected to dry lamination usually by pressing at 60° C. or higher temperature for 10 to 60 seconds, after drying at 40°–90° C. for 5 to 10 minutes.

The adhesive component (A) may optionally contain, in addition to the above components (a) and (b), various other conventional components such as thickening agents (e.g. acrylic, urethane, or polyvinyl alcohol thickening agent), potential crosslinking agents (e.g. epoxy compounds, oxazoline compounds, carbodiimide compounds, melamines, block isocyanate compounds), emulsifying agents, protective colloids, antiseptics, and further antioxidants, film-forming agents, antifreezing agents, pigments and dyes, and the like. The main component (A) may usually be adjusted to a pH range of 4 to 10 with the tertiary amine as used in the preparation of the polycarbonate-urethane dispersion or aqueous ammonia.

The curing component (B) is usually used in an amount of 1 to 100% by weight to the total weight of the main component (A), that is, 1 to 100 parts by weight to 100 parts by weight of the main component (A) [the weight being as solid]. When the amount of the curing component is less than 1% by weight, the curing component can not exhibit its function and causes problems such as inferior heat resistance in the final adhesive product, and on the other hand, when the amount is over 100% by weight, the adhesive tends to show disadvantageously shorter pot-life.

The adhesive of this invention composed of the above components is curable by crosslinking at a low temperature (e.g. at about 5° C.) and has a long pot-life with excellent viscosity stability, and further when it is applied to the adhesion of ABS base material with a skin material by vacuum forming, it shows the desired initial heat resistance and excellent durability.

EXAMPLES

This invention is illustrated by the following preparations, examples and reference examples but should not be construed to be limited thereto.

Preparations (1) Preparation of polycarbonate-urethane aqueous dispersion (I)

A polycarbonate diol (D-2000, OH value=57.4, a number average molecular weight=2000, manufactured by Toagosei Chemical Industries Co., Ltd., Japan) (200 g) are dissolved in methyl ethyl ketone (400 g), and thereto are added DMPA (13.4 g) and neopentyl glycol (5.2 g), and the mixture is stirred at 60° C. for 15 minutes. After adding hexamethylene diisocyanate (35 g) to the mixture, the temperature of the mixture is raised up to 80° C. and the mixture is reacted at 80° C. for 24 hours.

The reaction mixture of a carboxyl group-containing, hydroxy-terminated polyurethane polymer thus obtained is cooled to about 60° C. and then neutralized with triethylamine (10.1 g), and thereto is added a distilled water (300 g) by which the reaction mixture is self-emulsified to give an aqueous dispersion. The solvent is removed from the aqueous dispersion with an evaporater to give a polycarbonate-urethane aqueous dispersion (I) containing 45 % by weight of solid components and having pH 5–7.

(2) Preparation of polycarbonate-urethane aqueous dispersion (II)

A polycarbonate diol (D-2000, OH value=57.4, a number average molecular weight=2000, manufactured by Toagosei Chemical Industries Co., Ltd., Japan) (200 g) are dissolved in methyl ethyl ketone (400 g), and thereto is added DMPA (20.1 g), and the mixture is stirred at 60° C. for 15 minutes. After adding hexamethylene diisocyanate (35 g) to the mixture, the temperature of the mixture is raised up to 80° C. and the mixture is reacted at 80° C. for 24 hours.

The reaction mixture of a carboxyl group-containing, hydroxy-terminated polyurethane polymer thus obtained is cooled to about 60° C. and then neutralized with triethylamine (15.2 g), and thereto is added a distilled water (300 g) by which the reaction mixture is self-emulsified to give an aqueous dispersion. The solvent is removed from the aqueous dispersion with an evaporater to give a polycarbonate-urethane aqueous dispersion (II) containing 45% by weight of solid components and having pH 5–7.

(3) Preparation of the main (adhesive) component

The polycarbonate-urethane aqueous dispersion (I) or (II) obtained in the above (1) and (2) is admixtured with the following components in an amount shown below, and the mixture is adjusted to pH 7.5 with an aqueous ammonia to give the main components (I) or (II), respectively.

| Components | Parts by weight |
| --- | --- |
| Polycarbonate-urethane aqueous dispersion (I) or (II) (solid components, 45 wt. %) | 100 |
| Aqueous emulsion of ethylene-vinyl acetate copolymer (Airflex 421, manufactured by Air-Products, solid components, 50 wt. %) | 50 |
| Aqueous emulsion of rosinic acid ester (E-625, manufactured by Arakawa Kagaku K.K., Japan, solid components, 50 wt. %) | 5 |
| Aqueous emulsion of petroleum resin (700E, manufactured by Nippon Oil Co., Ltd., Japan, solid components, 50 wt. %) | 5 |
| Oxazoline-modified acrylic emulsion (K-2020E, manufactured by Nippon Shokubai Co., Ltd., Japan) | 20 |
| Film-forming auxiliary (Sorfit, manufactured by Kuraray Co., Ltd., Japan) | 5 |

(4) Preparation of a curing agent

A polyether diol (PR-1007, manufactured by ADEKA Co., Ltd.) (100 g) is defoamed under a reduced pressure at 100° C. and thereto is added hexamethylene diisocyanate (SUMIDUR H-S, manufactured by Sumitomo Bayer Co., Ltd., Japan) (65 g) and the mixture is reacted at 90° C. for 8 hours to give a polyurethane prepolymer having an NCO content of 13% by weight.

Examples 1 and 2

The main component (I) or (II) as prepared in the above Preparation (3) is used in combination with the curing agent as prepared in the above Preparation (4) as a two-pack aqueous adhesive. The main component and the curing agent are mixed in a ratio of 100/5 by weight with stirring just before use.

Adhesion test

The above aqueous adhesives were subjected to the following test.

The aqueous adhesive prepared by mixing well both components was applied onto a commercially available acrylonitrile/butadiene/styrene base material in an amount of 80 g/m² with a bar coater, and the resulting base material was dried at 70° C. for 3 minutes and to the base material was piled a polyurethane sheet which was previously heated to the surface temperature of 140° C., followed by pressing under 1.0 kg/cm² for 60 seconds to give a specimen.

The specimen thus prepared was subjected to the following tests, and the results are shown in Table 1.

Initial creep resistance

Immediately after the piling and pressing of the polyurethane sheet onto the base material, a load (100 g/inch) was applied to one end of the polyurethane sheet of the specimen at an angle of 90° in an atmosphere of 80° C., and the peel length (mm) was measured after 60 minutes.

Heat creep resistance

After allowing to stand the specimen under the conditions of 20° C., 65% of relative humidity (RH) for 24 hours, a load (100 g/inch) was applied to one end of the polyurethane sheet of the specimen at an angle of 90° in an atmosphere of 100° C., and the peel length (mm) was measured after 24 hours.

Hot peel strength after aging test

After allowing to stand the specimen at 20° C., 65% of RH for 24 hours, the specimen was further subjected to aging under the conditions as mentioned below, and then, the peel strength (kg/inch) thereof was measured at an angle of 180° in an atmosphere of 100° C.

Test for heat aging resistance: Allowed to stand at 100° C. for 2,000 hours.

Test for wet heat aging resistance: Allowed to stand at 50° C., 95% of RH for 400 hours.

In Table 1, the term "MB" means material break (break of the urethane sheet), and the term "AF" means interfacial failure.

Reference Example 1

To an aqueous emulsion of a polyester polyurethane (R-9621, manufactured by Zeneca K.K., Japan, solid components, 30% by weight) (100 g) were mixed an aqueous emulsion of an ethylene-vinyl acetate copolymer (EVA Tex 63, manufactured by Denki Kagaku K.K., Japan, solid components, by weight) (80 g) and a terpene-phenol resin emulsion (E-101, manufactured by Arakawa Kagaku K. K., Japan) (10 g), and thereto was further added a thickening agent (SAN NOPCO A-814, manufactured by SAN NOPCO LIMITED) (2 g) to give a main component.

The above main component is mixed with a curing agent, i.e. an aqueous dispersion of a polyisocyanate compound (Sumidur 0772, manufactured by Sumitomo Bayer Co., Ltd., Japan) in a ratio of 100/5 by weight to prepare an aqueous adhesive. The aqueous adhesive thus prepared was subjected to the adhesion tests in the same manner as mentioned above. The results are also shown in Table 1.

TABLE 1

|  | Examples | | |
|---|---|---|---|
|  | 1 | 2 | Ref. Ex. 1 |
| Initial creep resistance (mm) | 10 | 7 | Fall |
| Heat creep resistance (mm) | 0 | 0 | 2 |
| Hot peel strength after aging test (kg/inch) | | | |
| Heat aging resistance | 1.9 MB | 2.0 MB | 0.5 AF |
| Wet heat aging resistance | 1.8 MB | 1.7 MB | 0.5 AF |

What is claimed is:

1. A two-pack aqueous adhesive, which comprises
(A) a main component comprising
(a) an aqueous dispersion of a polycarbonate-urethane having a pH 5.0–8.5, which is prepared by self-emulsifying a carboxyl group-containing, hydroxy-terminated polyurethane polymer obtained from (i) a polycarbonate diol having the formula

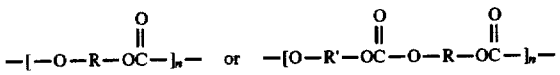

which have diol groups at both ends, wherein R and R' are the same as or different and are each a straight chain or branched chain alkyl group having 1 to 7 carbon atoms, a phenyl group, a phenylalkyl group having 1 to 4 carbon atoms in the alkyl moiety, a biphenyl group, or a cycloalkyl group having 5 to 6 carbon atoms, and n is 2 to 50, (ii) a carboxyl group-containing chain extender and (iii) a polyisocyanate compound in water in the presence of a tertiary amine, said carboxyl group-containing chain extender being used in an amount of 0.5 to 2.5 moles to 1 mole of the polycarbonate diol, and said polyisocyanate compound being used in an amount of 0.5 mole to less than 1 mole to 1 mole of the total amount of the polycarbonate diol and the carboxyl group-containing chain extender, and
(b) a conventional aqueous emulsion of a thermoplastic resin or a synthetic rubber, and
(B) a curing component comprising a polyisocyanate compound.

2. The aqueous adhesive according to claim 1, wherein the carboxyl group-containing chain extender is a compound of the formula:

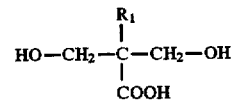

wherein $R_1$ is hydrogen atom or a straight chain or branched chain alkyl group having 1 to 3 carbon atoms.

3. The aqueous adhesive according to claim 2, wherein the carboxyl group-containing chain extender is a member selected from the group consisting of dimethylol-propionic acid, dimethylolbutyric acid, and dimethylolpontanoic acid.

4. The aqueous adhesive according to claim 1, wherein the polyisocyanate compound is a member selected from the group consisting of hexamethylene diisocyanate, 2,2,4-trimethylhexamethylene diisocyanate, isophorone diisocyanate, hydrogenated xylylene diisocyanate, 4,4-cyclohexylmethane diisocyanate, xylylene diisocyanate, tetramethylxylylene diisocyanate, toluene diisocyanate, or diphenylmethane diisocyanate.

5. The aqueous adhesive according to claim 1, wherein the tertiary amine is a compound of the formula:

$$\begin{array}{c} R_1 \\ | \\ N-R_2 \\ | \\ R_3 \end{array}$$

wherein $R_1$, $R_2$ and $R_3$ may be the same or different and are each a straight chain or branched chain alkyl group having 1 to 4 carbon atoms, $-(CH_2)_n-OH$, $-(CH_2O)_m-OH$, $-(CH_2CH_2O)-OH$, $$-(CHCH_2O)_m-OH, -(CH_2CHO)_m-OH,$$
$$\phantom{-(CH}|\phantom{H_2O)_m-OH, -(CH_2C}|$$
$$\phantom{-(CH}CH_3\phantom{H_2O)_m-OH, -(CH_2C}CH_3$$

or $-((CH_2)_1-O)_m-H$; n is 1 to 4, m is 2 to 5, and l is 2 to 5.

6. The aqueous adhesive according to claim 1, wherein the curing component (B) is incorporated in an amount of 1 to 100% by weight to the main component (A).

* * * * *